United States Patent [19]

Ogawa

[11] Patent Number: 5,297,146
[45] Date of Patent: Mar. 22, 1994

[54] COMMUNICATION TERMINAL APPARATUS AND ITS CONTROL METHOD

[75] Inventor: Fukushige Ogawa, Hino, Japan

[73] Assignee: Kabushiki Kaisha Toshiba, Kawasaki, Japan

[21] Appl. No.: 846,988

[22] Filed: Mar. 9, 1992

Related U.S. Application Data

[63] Continuation of Ser. No. 586,387, Sep. 20, 1990, abandoned, which is a continuation of Ser. No. 372,089, Jun. 27, 1989, abandoned.

[30] Foreign Application Priority Data

| Jul. 1, 1988 | [JP] | Japan | 63-165661 |
| Jul. 1, 1988 | [JP] | Japan | 63-165662 |
| Jul. 1, 1988 | [JP] | Japan | 63-165663 |

[51] Int. Cl.⁵ ............................................. H04J 3/12
[52] U.S. Cl. ................................. 370/110.1; 370/62; 379/67; 379/96; 379/100; 379/206

[56] References Cited

U.S. PATENT DOCUMENTS

| 4,672,662 | 6/1987 | Nishino et al. | 370/58.1 |
| 4,722,082 | 1/1988 | Furuya et al. | 370/110.1 |
| 4,723,273 | 2/1988 | Diesel et al. | 379/210 |
| 4,782,510 | 9/1988 | Szlam | 379/88 |
| 4,825,461 | 4/1989 | Kurita et al. | 379/100 |
| 4,831,618 | 5/1989 | Bruce | 370/62 |
| 4,870,678 | 9/1989 | Adachi | 379/100 |
| 4,878,240 | 10/1989 | Lin et al. | 379/67 |
| 4,935,955 | 6/1990 | Neudorfer | 379/100 |
| 4,961,185 | 10/1990 | Sawada | 379/100 |

FOREIGN PATENT DOCUMENTS

| 0337610 | 3/1989 | European Pat. Off. | 379/100 |
| 0313313 | 4/1989 | European Pat. Off. | |
| 0357427 | 3/1990 | European Pat. Off. | |
| 1-190006 | 11/1989 | Japan | |

OTHER PUBLICATIONS

Duc, "ISDN Terminals and Integrated Services Delivery", IEEE Journal on Selected Areas in Communications, vol. SAC-4, No. 8, Nov. 1986, pp. 1188–1192.
Swart, "ISDN Business Services", ICC '86, Session 1, Paper 4, vol. 1, Jun. 22, 1986, pp. 1–5.

*Primary Examiner*—Douglas W. Olms
*Assistant Examiner*—Hassan Kizou
*Attorney, Agent, or Firm*—Finnegan, Henderson, Farabow, Garrett & Dunner

[57] ABSTRACT

A communication terminal apparatus and its control method which allow the parallel execution of a plurality of communications with use of a plurality of data channels. The terminal apparatus comprises an image main controller and a voice main controller which can be operated independently of each other, two network controllers operated as associated with the operations of these image and voice main controllers respectively, two image transmission control circuits which are operated independently of each other, and an image file capable of storing image and voice data, thereby realizing the simultaneous execution of image and image communications and the simultaneous execution of voice and voice communications on a duplex communication basis.

20 Claims, 8 Drawing Sheets

COMMUNICATION TERMINAL APPARATUS AND ITS CONTROL METHOD

This application is a continuation of application Ser. No. 07/586,387, filed Sep. 20, 1990, abandoned, which was a continuation of application Ser. No. 07/372,089, filed Jun. 27, 1989, abandoned.

BACKGROUND OF THE INVENTION

1. Field of the Invention

The present invention relates to communication terminal apparatuses and control methods thereof which can be connected to an integrated service digital network (hereinafter, which will be referred to as the ISDN) and, more particularly, to a communication terminal apparatus and its control method which allow the realization of parallel operation of a plurality of communications with use of a plurality of data channels allocated to each line of the ISDN.

2. Description of the Related Art

A general communication terminal apparatus such as a facsimile equipment connected to a public telephone line or a DDX line, can execute only one of voice and image data communications or alternately execute the voice and image data, that is, can perform only so-called half duplex operation.

This is because the above public telephone line or DDX line can basically have a band corresponding only to one-channel information, which results in that the simultaneous transmission of both the voice and image data leads to data deterioration and transmission ate reduction.

As the ISDN is put to practical use these days, the communication apparatus itself connected to the ISDN has been uniquely developed in the practical use of communication services.

As already known, the ISDN is an integrated digital network which integrally handles such service apparatuses different in contents to be handled as telephone sets, telex equipment and facsimile equipment and which has a plurality of channels for each ISDN line.

An attempt has ben made to realize the simultaneous transmission of voice and image data with use of the plural data channels of the ISDN line.

With the communication terminal apparatus connected to the ISDN, however, if a call demanding the reception of image data comes into the apparatus through second one of the plural data channels of the ISDN line, for example, during the reception of image data of the apparatus through first one of the data channels (during operation of an image printer in the apparatus), then the apparatus, in answer to the demand of reception of the new image data, can only send a busy tone back to the party terminal because the image printer is in operation, and thus the call from the party terminal becomes useless.

Further, for example, when the communication terminal apparatus, which is talking with the party through the first data channel of the ISDN line, receives an incoming call demanding a speech, i.e., a voice demanding call through the second data channel; the apparatus, in response to this new speech demand, can only send a busy tone indicative of the busy destination party back to the party terminal a busy tone, thus resulting in that the call from the party terminal becomes useless.

In this way, the prior art communication terminal apparatus has had problems that, when the apparatus receives the new image data demand through the second data channel during execution of the image data trough the first data channel and when the apparatus receives the new speech demand through the second data channel during talk through the first data channel, the apparatus cannot execute the new image and speech demands respectively, inevitably involving the reduction of its communication efficiency.

The present invention also provides a communication terminal apparatus and its control method which allows the simultaneous realization of a plurality of communications.

It is, accordingly, an object of the present invention to provide a communication terminal apparatus and its control method which, when receiving a new image data demand through a second data channel during execution of image data through a first data channel, can accept the new image demand and can perform different-direction full duplex communication over the image data, thus increasing its communication efficiency.

It is another object of the present invention to provide a communication terminal apparatus and its control method which, when receiving a new incoming voice signal through a second data channel during talk through a first data channel, can execute the new voice signal without sending a busy tone back to the party terminal, with a good communication efficiency.

SUMMARY OF THE INVENTION

In accordance with the present invention, a communication terminal apparatus comprises a plurality of independently operable network control means, network interface means for allocating operations of the plurality of network control means to a plurality of data channels of an integrated digital service line, a plurality of independently operable communication control means, and means for parallelly operating the plurality of network control means and the plurality of communication control means to execute a plurality of communications with use of the plurality of data channels of the integrated digital service line. With such an arrangement, the terminal apparatus can realize the simultaneous execution of a plurality of communications.

The communication terminal apparatus of the present invention also comprises a plurality of independently operable network control means, network interface means for allocating operations of the plurality of network control means to a plurality of data channels of an integrated digital service line, image transmission control means for independently executing a plurality of transmission procedures, image file means for storing an image data, image data input means for inputting an image data, image data output means for outputting an image data, and means, when the terminal apparatus receives a second communication request of image data from second one of the plurality of data channels of the integrated digital service line during its first communication of image data on first one of the plurality of data channels, for operating at least one of the image file means, the image data input means and the image data output means to execute the second communication of the image data. The terminal apparatus of such an arrangement, for example, when receiving an incoming new image data signal from the second data channel during reception of an image data signal of the first data channel at the image printer of the image data output means, once stores the received image data in the image file and as soon as the image printer becomes not used or idle, starts the execution such operational control as to record the once stored data at the image printer, thus realizing different-direction full-duplex communication of image communications in the transmission or reception or both directions.

The communication terminal apparatus also comprises a plurality of independently operable network control means, network interface means for allocating operations of the plurality of network control means to a plurality of data channels of an integrated digital service line, memory means for allowing write and read operation of voice data, and control means, when the terminal apparatus receives an incoming voice signal demanding a second speech on second one of the plurality of data channels of the integrated digital service line during its first speech on first one of the plurality of data channels, for reading out from the memory means a predetermined voice data stored in memory and transmitting it to the party, and also for writing in the memory means a data of the voice signal received from the party. With such an arrangement, the terminal apparatus, even when receiving an incoming voice signal demanding a speech through the second data channel during speech of the first data channel, can collect the voice data from the party terminal and temporarily store it in the image file, and can read out the stored data from the image file as necessary after the completion of the speech of the first data channel for its reproduction. That is, the terminal apparatus can accept a voice data from the party terminal without immediately taking its busy operation to the party terminal.

The communication terminal apparatus also comprises, a plurality of independently operable network control means, network interface means for allocating operations of the plurality of network control means to a plurality of data channels of an integrated digital service line, key input means, display means, operation control means for controlling operations of the key input means and the display means, voice main control means for controlling operation on voice communication, image main control means for controlling operation on image communication, detection means for detecting a dial number of a signal originator terminal informed from the integrated digital service line at the time of signal reception, display control means for indicating on the display means the dial number of the originator terminal detected by the detection means through the operation control means, received-voice-signal multiplexing means, when the terminal apparatus receives an incoming voice signal from second one of the plurality of data channels of the integrated digital service line during its speech on first one of the plurality of data channels, for adding the received voice signal to the first data channel of the speech mode, switching control means for switchingly controlling connection of the first or second data channel or both data channels to the voice control means, voice multiplexing means for adding the voice signal according to a switched state of the switching control means, and holding-tone transmitting means for transmitting a holding tone to one of the data channels switched to a hold state by the switching control means. With such an arrangement, when the terminal apparatus receives an incoming voice signal through the second data channel during speech of the first data channel, the incoming signal is added to the first data channel of the speech state and the dial number of the then signal originator terminal is indicated on the display unit. When the operator gives a predetermined answering operation after confirming the displayed data, switching control between the first and second data channels is carried out so that the voice signal is added to one of the data channels switched to the speech state according to the switching operation and a holding tone is transmitted to the other switched to the hold state, thus realizing the control of speech channels. In this manner, based on such speech control as mentioned above, the terminal apparatus can switch the data channel in the speech state to the hold state to answer to a request of new speech from the other data channel and, if necessary, can realize three-party speech through the both data channels, without immediately taking a busy operation to the reception of the new voice signal.

DESCRIPTION OF THE PREFERRED EMBODIMENT

An embodiment of the present invention will e detailed by referring to accompanying drawings.

Figure 1:
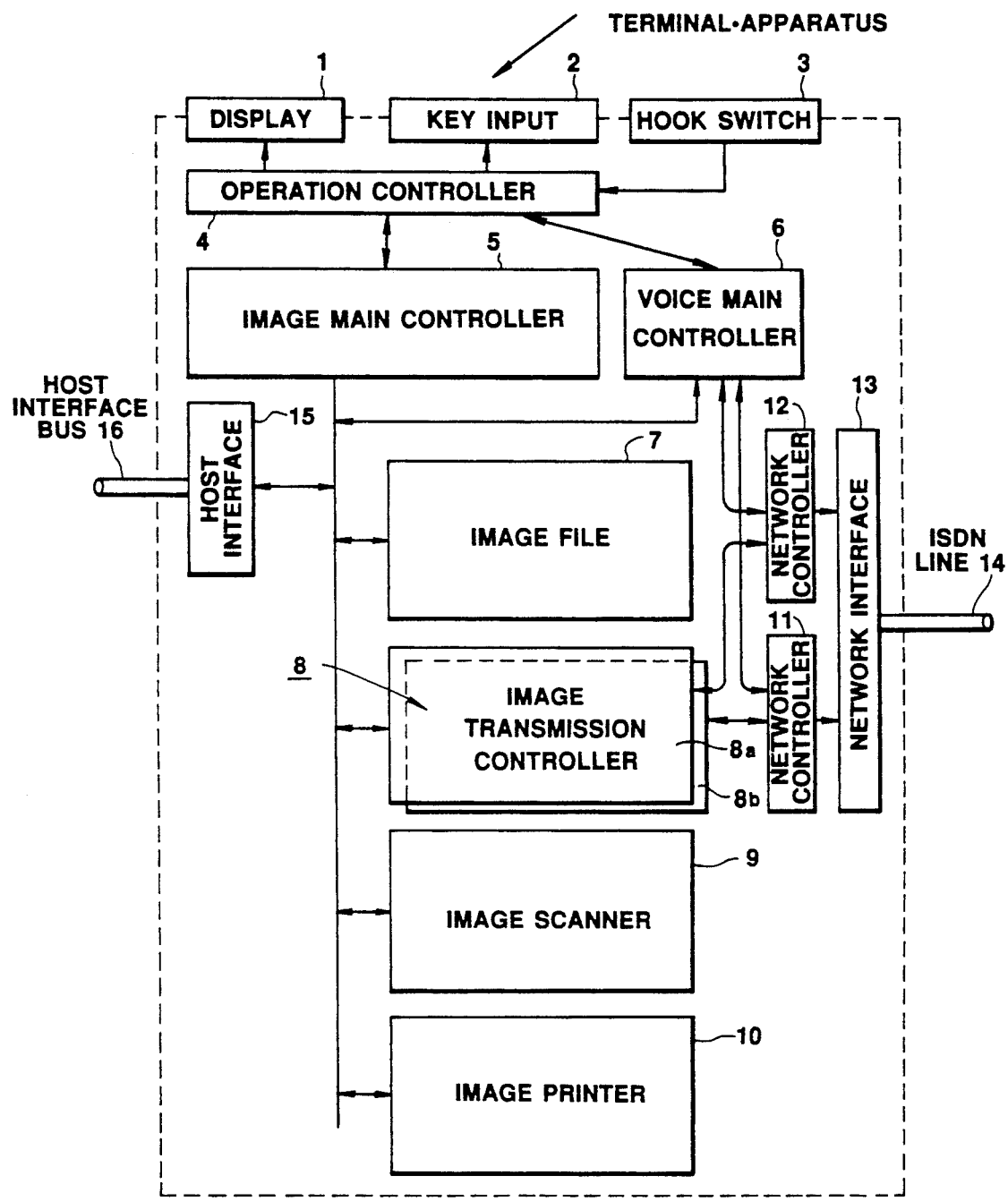
FIG. 1 is a block diagram showing an embodiment of a communication terminal apparatus in accordance with the present invention.

Referring first to FIG. 1, there is shown a block diagram of an embodiment of a communication terminal apparatus in accordance with the present invention.

In the drawing, a display 1 comprises a liquid crystal display and a lamp which are used to indicate operational guidances on incoming and outgoing calls. A key input unit 2 comprises control panel having ten keys through which an operator strokes keys for incoming and outgoing calls to provide a key input to the apparatus. A hook switch 3 is put in an on-hook or off-hook state through the operator's key input operation of the key input unit 2. An operation controller 4 plays a role of operational control according to the input conditions of the key input unit 2 and hook switch 3 provided through operator's operation, that is, a role of man-machine interface. An image main controller 5 is provided to carry out general operational control including the transmission, reception and copy of image communication. A voice main controller 6 is provided to carry out general operational control on voice communication including the control of a speech circuit to realize a speech. An image file 7 comprises such a memory as a disk which allows the simultaneous execution of the write and read operations of the image data. An image transmission controller 8 controls two independent transmissions on image data in accordance with such a facsimile procedure as a G4 or G3 procedure. An image scanner 9 acts to scan and read image data. An image printer 10 converts the image data to a hard copy (printout). Network controllers 11 and 12 execute procedures for incoming/outgoing calls with respect to an ISDN (not shown) line 14 connecting the communication terminal apparatus and the ISDN. A network interface 13 interfaces between the communication terminal apparatus and the ISDN. A host interface 15 interfaces between a not shown host computer and the communication terminal apparatus. A host interface bus 16 includes buses such as GP-IB and LAN connected to this host computer.

The communication terminal apparatus of the present invention of FIG. 1 has the image main controller 5 and voice main controller 6 separately provided as well as the two network controllers 11 and 12 separately provided as associated with the respective operations of the controllers 5 and 6.

With the communication terminal apparatus of the present invention, since the network controllers 11 and 12 are operated independently of each other under the control associated with the network interface 13, the image and voice communications can be simultaneously processed through two data channels of the ISDN line 14.

In the communication terminal apparatus of the present embodiment, the image transmission controller 8 can control two independent transmissions on image communication in accordance with such a transmission procedure (facsimile procedure) as a G4 or G3 procedure. More specifically, the image transmission controller 8 comprises two circuits which have the same function and are independently operated in association with the network controllers 11 and 12, that is, comprises first and second image transmission control circuits 8a and 8b.

With such an arrangement, even when it is desired to carry out two image communications at the same time, the first or second image transmission control circuit 8a or 8b is independently operated depending on the use of the network controller 11 or 12 while the image file 7 performs the write or read operation of the image data, and further the image scanner 9 or the image printer 10 is started as necessary, whereby a so-called different-direction full-duplex operation on image communication can be realized both in a signal transmission mode and in a signal reception mode.

In the present embodiment, the image file 7 is arranged to store therein voice and image data separately.

In the illustrated embodiment, the voice main controller 6, which is connected also with the aforementioned image file 7, comprises, in addition to the control means for the speech circuit, means for decoding a voice data to a format processable at the image file 7 and means for registering voice data corresponding to a prescribed voice message in the image file 7.

Figure 2:
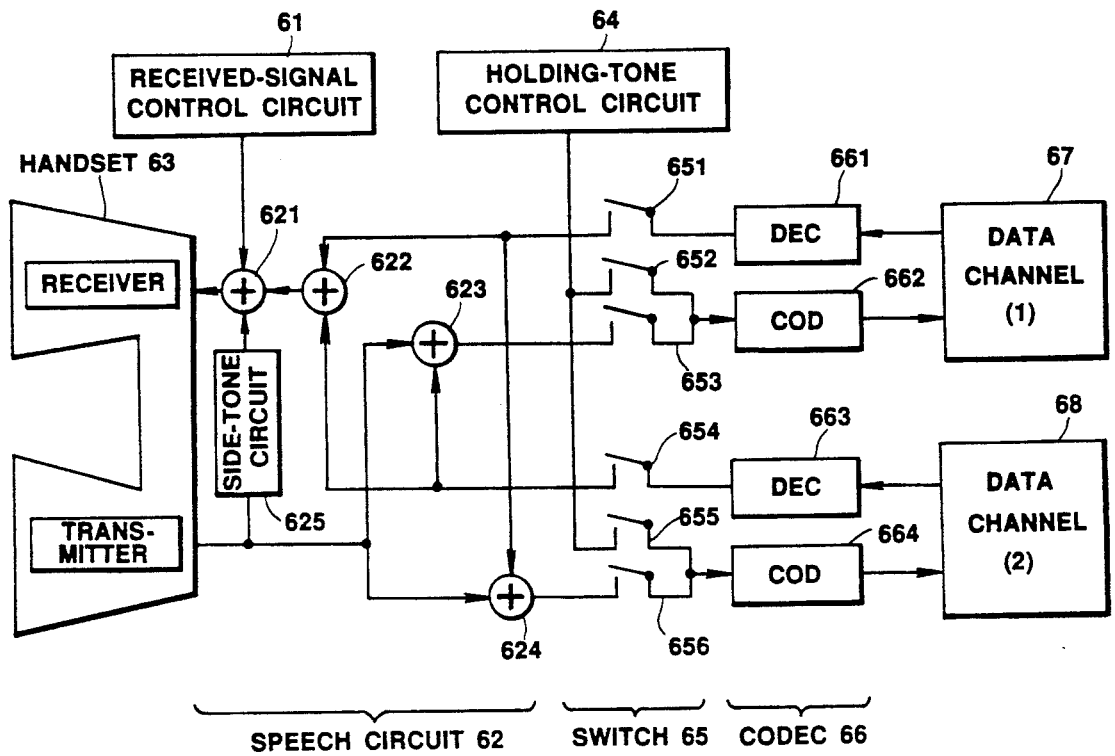
FIG. 2 is a block diagram of the circuit of a voice main controller in the communication terminal apparatus of FIG. 1.

With such an arrangement of the communication terminal apparatus of the present embodiment, for example, even when the apparatus receives a new incoming voice signal demanding a speed through a second data channel of the ISDN line 14 during its speech through a first data channel of the line 14, the apparatus cannot send a busy tone to the party terminal of demanding the new speed but can cope with it.

in the present embodiment, the voice controller 6 has such a voice circuitry as shown in FIG. 2. The voice circuitry includes an incoming-signal control circuit 61, a speech circuit 62, a telephone handset 63, a holding-tone control circuit 64, a switch 65, a codec 66, a first data channel 67 and a second data channel 68. The speech circuit has adder circuits 621 and 624 and a side-tone circuit 625.

The switch 65 has contacts 651 and 656, while the codec 66 has decoder circuits 661 and 663 and coder circuit 662 and 664 for the first and second data channels 67 and 68, respectively.

In the communication terminal apparatus of the embodiment having such an arrangement as mentioned above, for example, even when a new voice signal comes into the apparatus through the second data channel 68 of the ISDN line 14 during talk operation of the apparatus through the first data channel 67 of the line 14, the apparatus can cope even with the new speech demand without taking a busy action.

When the terminal apparatus receives an incoming voice signal from the ISDN line 14, the associated dial number is usually informed from the signal originator terminal via the network interface 13 to the present apparatus. To this end, provided in the terminal apparatus of the embodiment is a detection circuit which detects the dial number informed from the signal originator terminal at the time of the reception of the voice signal.

Further, for the purpose of realizing the operation interlinked with the functions of the network controllers 11 and 12, the voice main controller 6 includes a display control circuit which causes the dial number of the signal originator terminal detected by the detection circuit to be indicated on the display under the operation controller.

The respective modules of the communication terminal apparatus of the embodiment including, for example, the image scanner 9 and the image printer 10 are all designed to be operated under control of commands. For this reason, the image main controller 5 can control such a module as the image canner 9 by sending an associated command to the scanner.

Similarly, the notification of end of the processing operation, for example, to the image scanner 9 can be carried out by sending an associated command from the image scanner 9 to the image main controller 5.

In this way, since the terminal apparatus of the embodiment is made up of the modules which can be operated under control of commands, the operation of the apparatus may also be controlled by means of such an external equipment as a host computer connected via the host interface bus 16 to the host interface 15.

Figure 3:
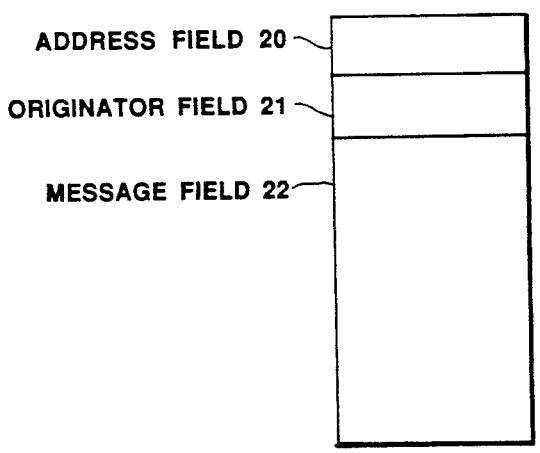
FIG. 3 is a conceptive diagram for explaining an example of a command used when the communication terminal apparatus of the embodiment is controlled by a host computer as an external connection apparatus.

Shown in FIG. 3 is an example of one of commands used in control of the operation of the terminal apparatus of the embodiment, which exemplary command is constituted of an address field 20, a signal-originator field 21 and a message field 22.

With such a command structure, such modules as the image main controller 5, address numbers each not used twice, that is, unique in the terminal apparatus are allocated respectively to the image scanner 9 and the image printer 10, so that a unique address number is placed in the address field 20 of the associated module.

Placed in he message field 22 is such a binary code as means "start" or "end".

The host computer, when actually operating the communication terminal apparatus, first creates a start command having such a format as mentioned above and then transmits this command therefrom through the host interface bus 16 and the host interface 15 to the interior of the terminal apparatus.

The terminal apparatus, when receiving this start command, causes, for example, the image scanner 9 to start its operation under control of the start command, in which case the originator of the start command is not important and the notification of the end of the processing operation is only returned to the originator address of the start command.

For this reason, the host computer can control the communication terminal apparatus of the present embodiment in its various operations by sending various commands to the host interface 15 like the image main controller 5 sends commands.

The operation of the communication terminal apparatus will be detailed by referring to a flowchart shown in FIGS. 4 to 9.

In the calling mode, the operator first gives a key input necessary for the calling through operator's operation of the key input unit 2 of the terminal apparatus on the ceiling side, or he or she picks up the telephone handset 63 of the voice controller 6 to put the handset 63 in its off-hook state and to cause the hook switch 3 to detect the off-hook state.

These operational states are informed to the operation controller 4.

Figure 4:
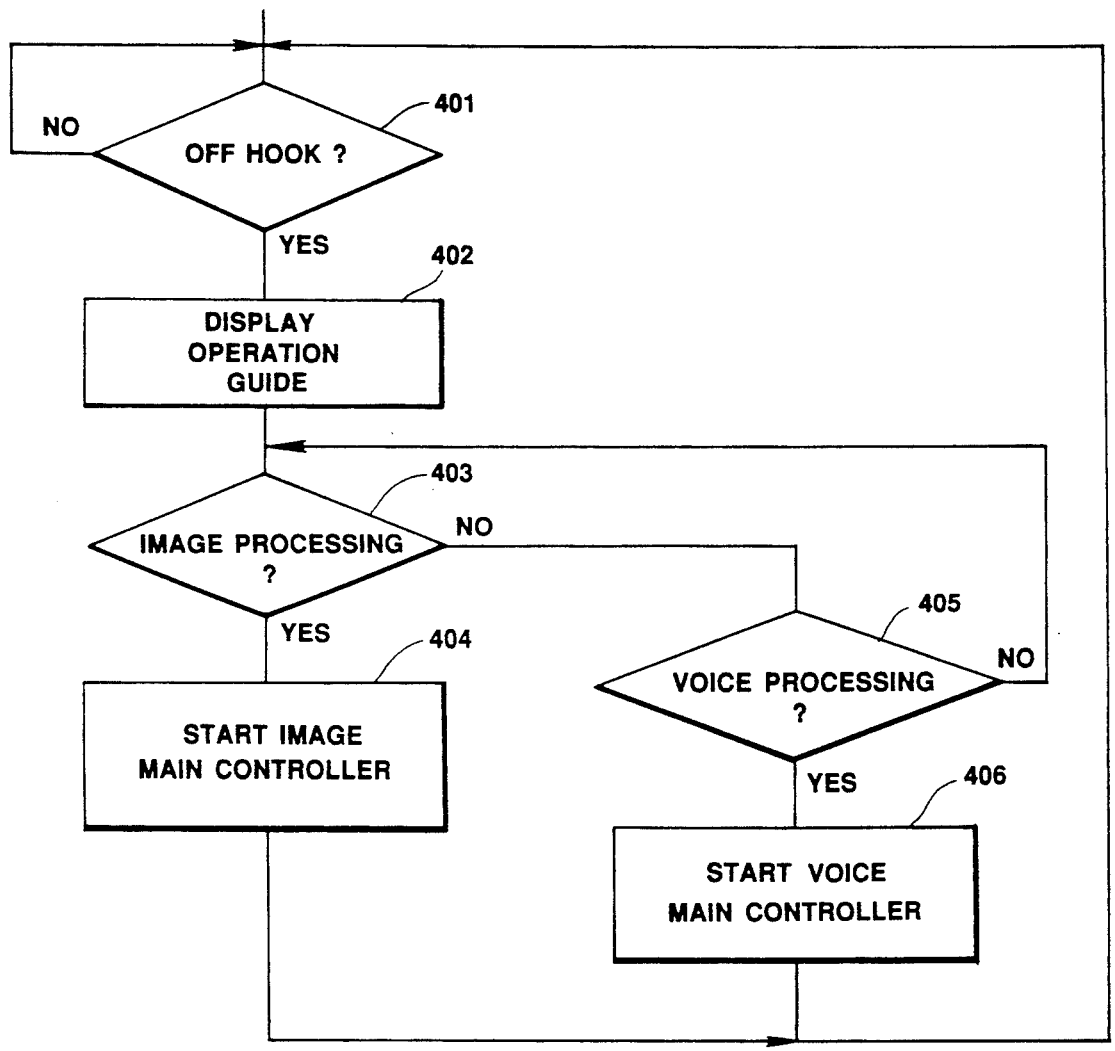
FIGS. 4 to 9 show a flowchart for explaining the processing operation of respective parts of the communication terminal apparatus of the embodiment.

The operation controller 4 in turn operates in accordance with a flowchart of FIG. 4. More specifically, the operation controller 4, when detecting the off hook state of the off-hook switch 3 (step 401), causes the display unit 1 indicates on its display screen operational guides including services (image processing and voice processing) to be selected (step 402), prompting the operator to enter an input.

When the operator operates the key unit 2 in accordance with the operation guidances appearing on the display 1, this cause the selection of the services or the input of calling data relating to the dial number, etc. of a destination facsimile equipment to be called.

When the service selected through the operator's key input operation is the image processing (step 403), the operation controller 4 starts the processing operation of the image main controller 5 (step 404).

When the selected service is the voice processing (step 405), the operation controller 4 starts the processing operation of the voice main controller 6 (step 406).

Thereafter, the image main controller 5 and the voice main controller 6 control the main operations of the image and voice processings, that is, individually monitor and execute the start and continuation of the processing, the detection of absence or presence of an abnormality, end, etc.

Figure 5:
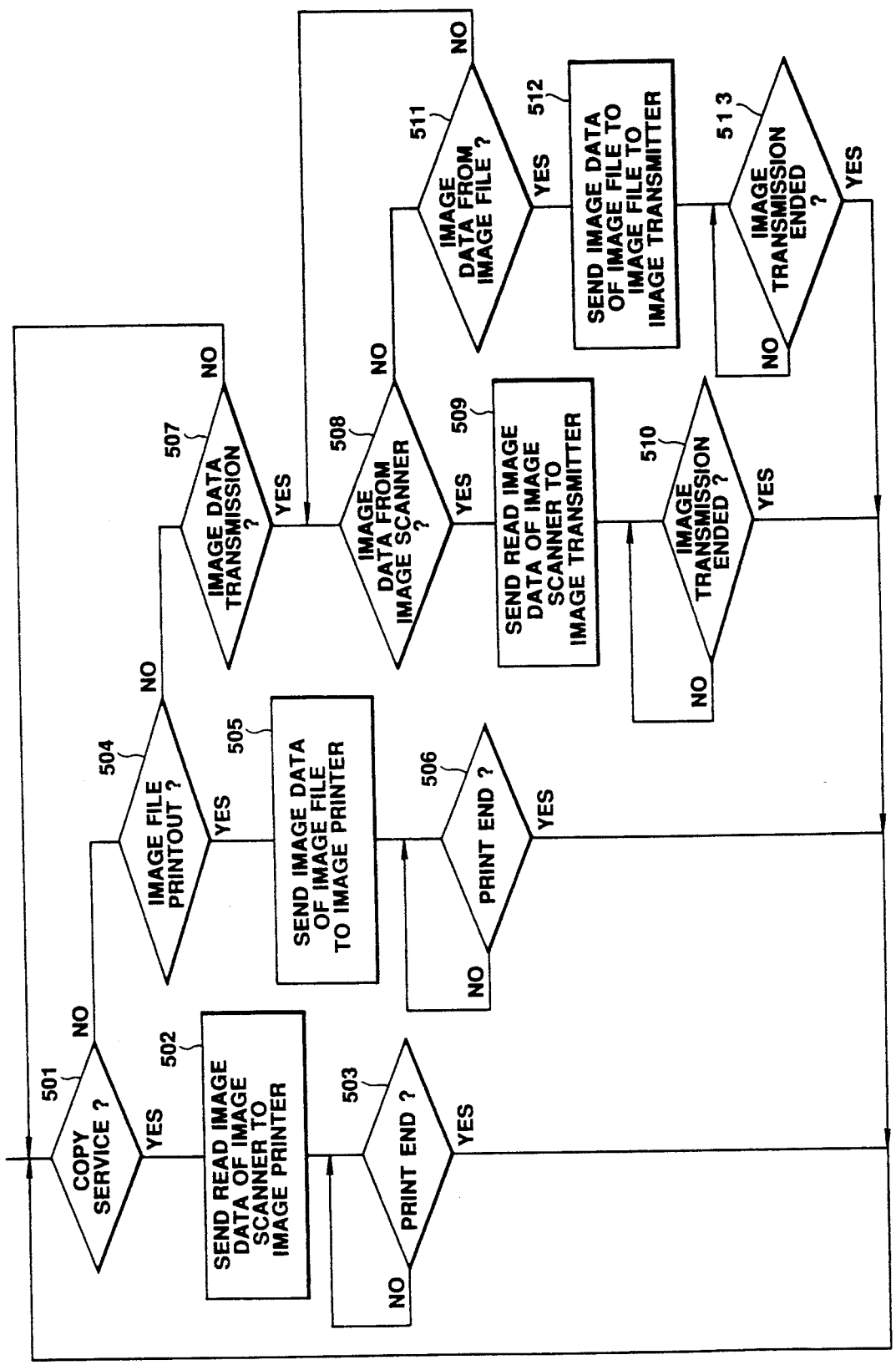

Explanation will first be made as to the processing operation of the image main controller 5. The processing operation of the image main controller 5 is shown in FIG. 5. The image main controller 5 collectively controls the respective operations of the image file 7, image transmission controller 8, image scanner 9 and image printer 10 on the basis of the key input data obtained through the selection operation of various services of the image processing to thereby realize the selected service.

When there is, for example, a copy service demand (step 501), the image main controller 5 issues such a command to the image scanner 9 that causes an image data obtained through the scanning and reading operation of the image scanner 9 to be output to the image printer 10 (step 502), and the image main controller 5 monitors the above processing operation until it receives its processing-end notification from the image scanner 9 (step 503).

When there is a demand of printout of image data already stored in the image file 7 (step 504), the image main controller 5 issues such a command to the image file 7 that causes the image data of the image file to be output to the image printer 10 (step 505), and the controller 5 monitors the above processing operation until it receives its processing-end notification from the image file 7 (step 506).

When there is a request that image data is to be transmitted to a destination communication terminal apparatus to be called (step 507), the image main controller 5 judges whether or not the image data to be transmitted is from the image scanner 9 (step 508). When the image main controller 5 judges that the image data is from the image scanner 9, the controller 5 issues such a command to the image scanner 9 that causes image data obtained through the scanning and reading operation of the scanner 9 to be output to the image transmission controller 8 (image transmission control circuit 8a or 8b) (step 509); and the controller 5 monitors the above processing operation until it receives its processing-end notification from the image scanner 9 (step 510).

If the image data to be transmitted is from the image file 7 (step 511), then the image main controller 5 issues such a command to the image file 7 that causes the stored image data to be output to the image transmission controller 8 (image transmission control circuit 8a or 8b) (step 512), and the controller 5 monitors its processing operation until it receives its processing-end notification from the image scanner 9 (step 513).

The image transmission controller 8 also informs the calling request to the network controller 11 or 12 associated with the image transmission control circuit 8a or 8b under control of the image main controller 5.

In response to this request, for example, the network controller 11 or 12 executes the calling procedure of the image transmission through the network interface 13.

In this calling procedure, idle one of the plurality of data channels of the ISDN line 14 is seized so that the image data transmitted from the image scanner 9 or the image file 7 to the image transmission controller 8 (image transmission control circuit 8a or 8b) is transferred to the destination terminal apparatus to be called. Explanation will next be made as to the processing operation of the voice main controller 6.

Figure 6:
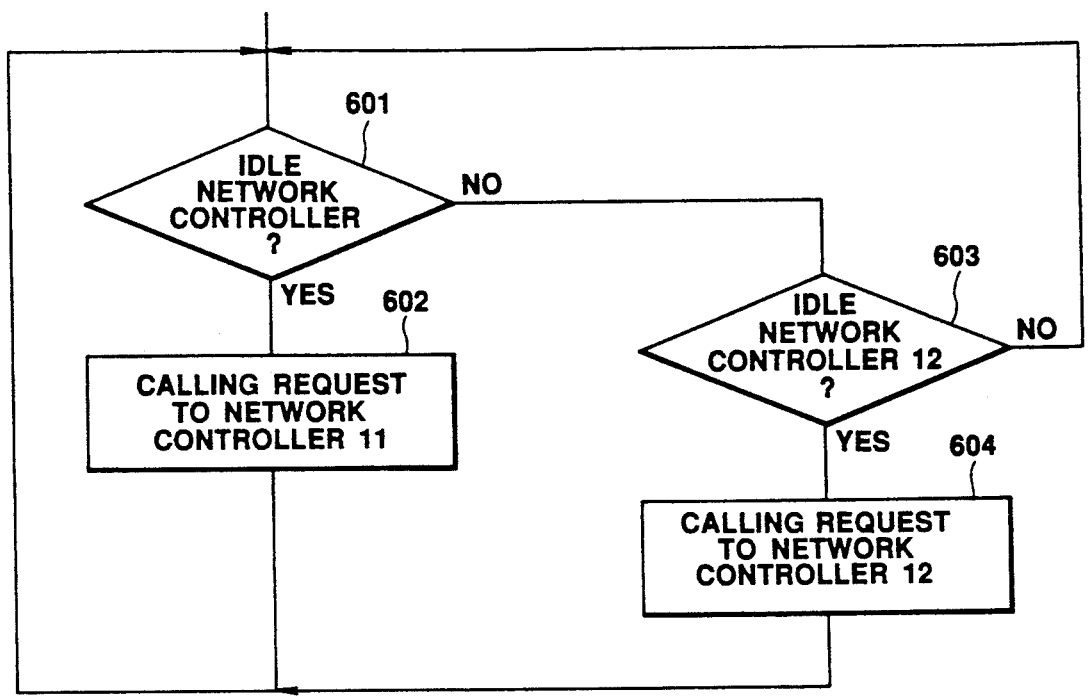
Figure 7:
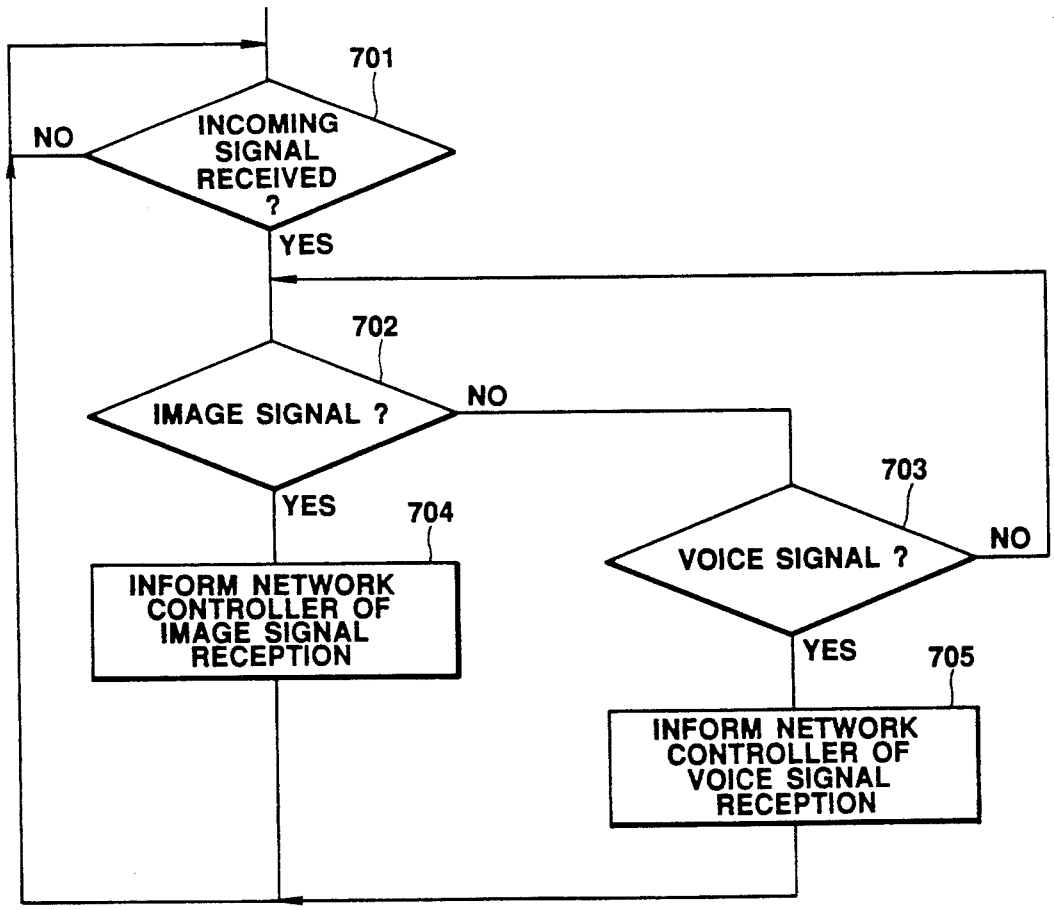

The processing operation of the voice main controller 6 is shown in by a flowchart of FIG. 6. More in detail, the voice main controller 6 informs the network controller 12 or 11 of a calling request on the basis of the previously-mentioned key input data obtained through the operator's selection operation of the key input unit 2 on the voice processing service. That is voice main controller 6 first judges whether or not the network controller 11 is idle (step 601). If the network controller 11 is idle, then the main controller 6 selects the idle controller 11 and issues a calling request to the controller 11 (step 602). The voice main controller 6, after determining in the step 601 that the network controller 11 is being used, next judges whether or not the network controller 12 is idle (step 603). If idle, then the controller 6 selects the network controller 12 and issues a calling request to the controller 12 (step 604).

In answer to this request, if for example, the network controller 12 is selected, the controller 12 executes the calling procedure relating to the voice transmission through he network interface 13.

After idle one of the data channels of the ISDN line 14 is seized based on the calling procedure, the voice main controller 6 controls its speech circuit and so on, whereby a speech is realized between the present terminal apparatus and the destination terminal apparatus to be called through the idle data channel.

The operation of the communication terminal apparatus of the present embodiment in the signal-receiving mode will next be explained. The processing operation of the network interface 13 in the signal receiving mode is shown by a flowchart of FIG. 7. More specifically, when the network interface 13 receives an incoming signal from the ISDN line (step 701), it judges whether the incoming signal is an image signal or a voice signal (steps 702 and 703) and informs the network controller 11 or 12 of the judgement result (steps 704 and 705).

In the case where the incoming signal is an image signal and the reception of the image signal is informed to, for example, the network controller 11, the network controller 11 informs the related image transmission control circuit 8a in the image transmission controller 8 of the signal reception.

The image transmission controller 8 also informs the image main controller 5 of the signal reception and then sends the image data of the received signal to the image file 7 or the image printer 10.

As a result, the image file 7 or the image printer 10 will store or printout the image data under control of the image main controller 5.

Prior to the above operation, the image main controller 5 issues a command to the operation controller 4 to cause the display 1 to indicate thereon "a display prompting the operator to answer to the image signal reception", and thereafter the controller 5 monitors its processing operation until it receives its processing-end notification from the image transmission controller 8.

When the incoming signal is a voice signal and the reception of the voice signal is informed to the network controller 12, the controller 12 informs the voice main controller 6 of the reception of the voice signal.

As a result, the voice main controller 6 controls its speech circuit and so on to thereby perform a speech with the calling party.

Prior to this operation, the voice main controller 6 issues such a command to the operation controller 4 that causes the display unit 1 to indicate thereon "a display prompting the operator to answer to the voice signal reception", and thereafter the controller 6 monitors its processing operation until the speech is completed.

In this way, with the communication terminal apparatus in accordance with the present invention, the network controllers 11 and 12, which are provided so as to be associated with the respective operations of the image main controller 5 and the voice main controller 6, are operated independently under the control associated with the network interface 13, thereby enabling the simultaneous processing of the image and voice communications with use of two idle data channels of the ISDN line 14.

Explanation will next be made as to the case where, while talking through the first data channel of the ISDN line 14, the terminal apparatus receives an incoming speech request signal through the second data channel.

In this case, the network interface 13 judges the incoming signal is a voice signal and the effect is informed from the network interface 13 to the voice main controller 6, for example, through network controller 12 operable as associated with the second data channel.

Figure 8:
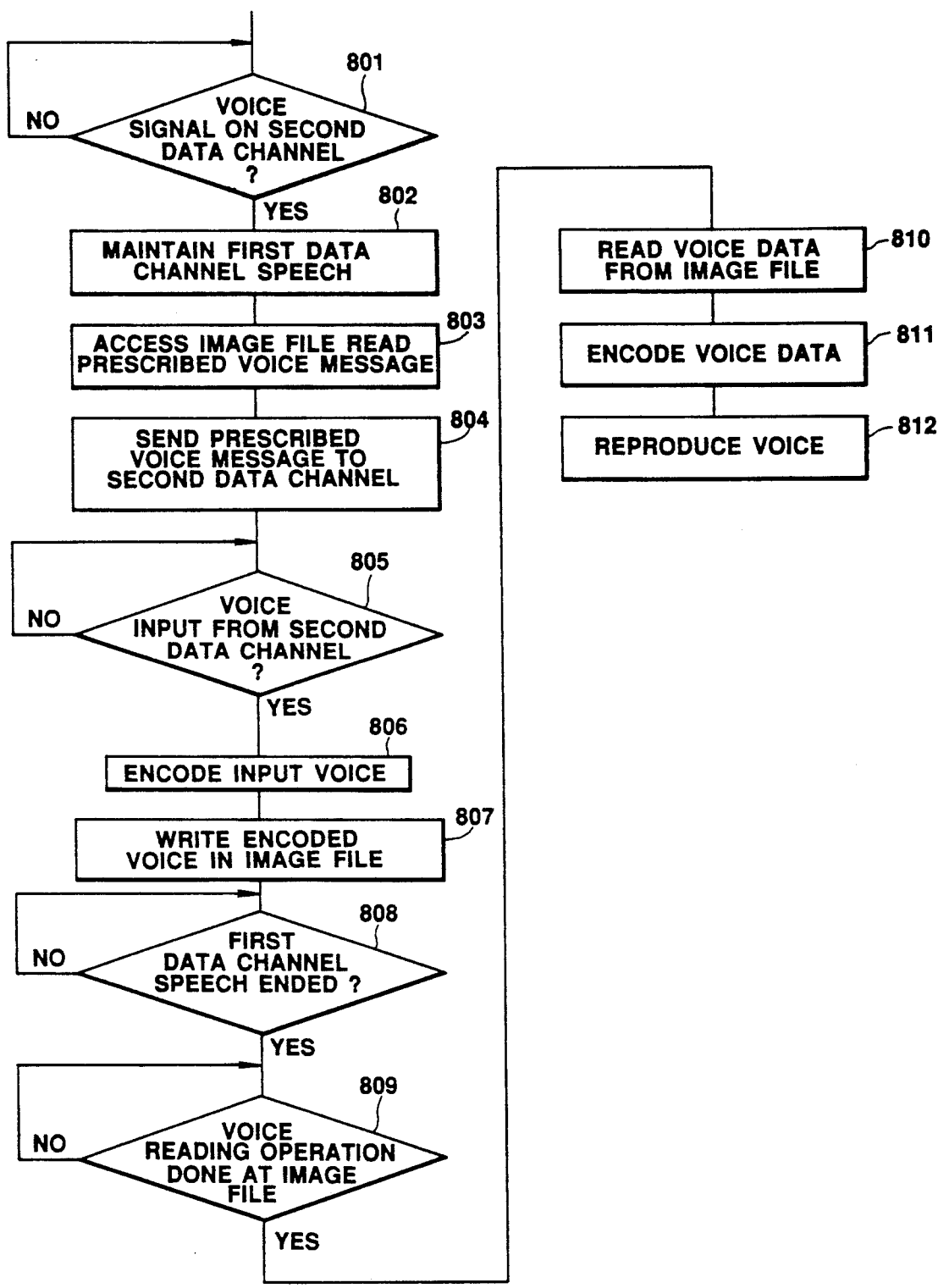

The operation of the voice main controller 6 in the above case is shown by a flowchart of FIG. 8. The voice main controller 6, when receiving a speech request notification through the second speech channel during speech through the first data channel (step 801), while maintaining the speech through the first data channel (step 802), makes access to the image file 7 to read a prescribed voice message therefrom (step 803), and further transmits the read voice message to the party terminal apparatus which has issued the speed request, through the network controller 12, network interface 13 and second data channel (step 804).

This voice message is previously written in the image file 7 by aforementioned registering means.

Thereafter, A voice data transmitted from the party terminal in response to the voice message is received at the reception-side terminal apparatus through the second data channel and then applied to the voice main controller 6 therein by the opposite route to the above.

The voice main controller 6, when applied with the above voice data (step 805), encodes the voice data into a signal having a format processable at the image file 7 (step 806), and transfers the encoded data to the image file 7 to write it in a memory zone therein (step 807).

Subsequently, the voice main controller 6, which is monitoring whether or not the speech on the first data channel is completed (step 808), when detecting the end of the speech, judges whether or not the reading operation of the above voice data already written in the image file 7 has been provided (step 809). When the voice main controller 6 determines that the reading operation of the voice data has been provided, controller 6 starts reading the voice data so far stored in the image file 7 therefrom (step 810).

The voice main controller 6 then decodes the voice data read out from the image file 7 into a signal having a format adaptable for the speech circuit (step 811), and reproduces the decoded signal through the handset or the like (step 812).

The present communication terminal apparatus based on the aforementioned control, when receiving a speech request from a party terminal during the speech operation, cannot take its busy operation but can reliably give the operator the message sent from the party terminal.

The above control is designed so that the voice data received from the party terminal can be stored in the image file 7 as it is in the same format as when the voice data is transmitted on the data channel, for example, in the format of a transmission rate of 64 Kbps, there can e eliminated the need for provision of such special means for encoding the voice data into a signal having a format storable in the image file 7.

With the communication terminal apparatus of the present embodiment, when there is provided in the apparatus such a mode that, even in cases other than when there are two voice communication requests at the same time as mentioned above, the voice data of the received signals can be stored in the image file 7, the setting of this mode as necessary also enables the addition of a so-called automatic answering telephone function in the absence of the operator.

Description will now be made as to another example of the control of the terminal apparatus when receiving a new voice signal through the second data channel 68 of the ISDN line 14 during speech through the first data channel 67 of the line 14. In such a condition, the network interface 13 judges the presence of the incoming new voice signal and informs of the effect, for example, the network controller 12 operable as associated with the second data channel 68.

The network controller 12 in turn detects a notification indicative of the presence of this voice signal reception as well as the dial number of the call originator terminal from the network interface 13, and then applies them to the voice main controller 6.

Figure 9:
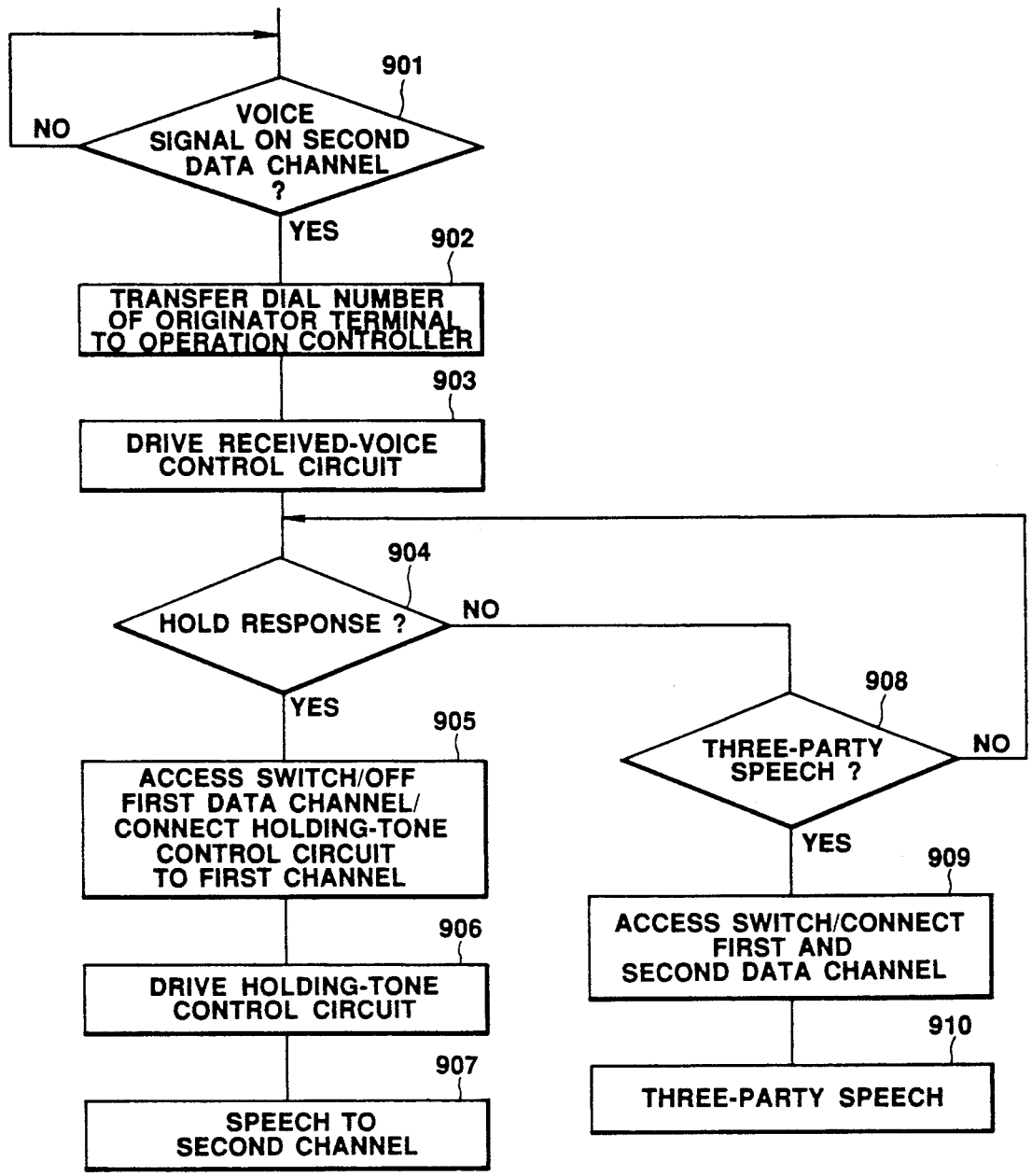

The operation of the voice main controller 6 under the above condition is given by a flowchart of FIG. 9. The voice main controller 6, when receiving the voice-signal reception notification and the dial number of the originator terminal (step 901), transfers the dial number of the originator terminal also to the operation controller 4 (step 902) which in turn controls the display unit 1 to indicate thereon the dial number.

The voice main controller 6, as soon as the detection circuit of the network controller 12 detects the dial number of the originator terminal, starts the received-signal control circuit 61 (step 903) and superimposes the signal reception tone on the receiver system of the telephone handset 63 through the adder circuit 621. This enables the operation talking with the party to recognize the generation of the new received voice signal by the signal reception tone emitted from the receiver of the handset 63. In addition, the operator can know the then originator terminal by looking at the dial number indicated on the display 1 based on the above control.

Thereafter, if the operator wishes to answer to the speech request from the originator terminal, he can show his intention by giving a hooking action to the hook switch 3.

Through this hooking action, operator's intention of answering to the speech request is informed to the voice main controller 6 through the operation controller 4.

The voice main controller 6, when receiving the answer intention notification (step 904), quickly makes access to the switch 65 in which the contacts 651 and 653 are switched from their ON state to the OFF state on the side of the first data channel 67 while the contacts 654 and 656 are switched form their OFF state to the ON state on the side of the second data channel 68 (step 905).

As a result, the first data channel 67 is put in the interconnection cut-off state from the speech circuit 62.

Under such a condition, the voice main controller 6 switches the contact 652 from its OFF state to the ON state and at the same time, starts the holding-tone control circuit 64 (step 906) to transmit a holding tone via the encoder circuit 662 to the first data channel 67.

Thereafter, the first data channel 67 is kept in its hold state until it receives a release order, for example, issued through operator's re-hooking action.

The second data channel 68, on the other hand, is newly connected to the speech circuit 62 under the above switching control (step 905) to be thereby put in its speech state (step 908).

In this speech state of the second data channel 68, the voice data of the originator terminal coming from the second channel 68 is decoded at the decoder circuit 663 and then sent via the contact 654 and the adders 622 and 621 to the receiver of the handset 63 to be reproduced therein.

On the contrary, a voice signal issued from the transmitter of the handset 63 is sent via the adder 624 and contact 656 to the encoder 663 to be encoded therein, and then transmitted through the second data channel 68 to the originator terminal.

Under such a condition that the first data channel 67 is in the hold state and the operator is talking with the party through the second data channel 68, if the speech is completed or the operator again gives a data-channel switching instruction, then the reverse switching control to the above over the contacts 651, 653, 654 and 656 under the voice main controller 6 causes the termination of the speech through the second data channel 68 and instead the restart of the speech through the first data channel 67.

At this time, the contact 652 is switched from the ON state to the OFF state and at the same time, the transmission of the holding tone from the holding-tone control circuit 64 is stopped.

Further, when it is desired to put the speech of the second data channel 68 in the hold state, the contact 655 is switched from the OFF state to the ON state so that the holding-tone control circuit 64 transmits a holding tone via the contact 655 to the second data channel 68.

The ordinary hold answering operation between two parties has been explained in the foregoing.

The communication terminal apparatus of such an arrangement as mentioned above in accordance with the present invention can also realize a three-party speech which follows.

In the three-party speech mode, the operator, unlike the aforementioned hold answering operation, issues an instruction demanding the three-party speech, for example, through predetermined key operation of the key input unit 2.

Assume now that, when the first data channel 67 is in the speech state and the second data channel 68 is in the hold state, the operator issued the three-party speech instruction.

The operator's key operation is informed from the key input unit 2 via the operation controller 4 to the voice main controller 6.

The voice main controller 6, when receiving this instruction from the key input unit 2 (step 908), maintains the contacts 651 and 653 in the ON state and switches the contacts 654 and 656 to the ON state.

This results in that the first and second data channels 67 and 68 are both connected through the codec 66 to the speech circuit 62 (step 909).

Under such a condition, in the receiver circuit system of the handset 63, voice data respectively coming from the first and second data channels 67 and 68 are decoded at the decoders 661 and 663, sent through the contacts 651 and 654 to the adder 622, added together at the adder 622, and then reproduced at the receiver of the handset 63 through the adder 621.

In the circuit system of the transmitter of the handset 63, on the other hand, a voice signal from the transmitter is added at the adders 623 and 624 to received-speech signals sent from the second and first data channels 68 and 67, sent through the contacts 653 and 656 to the encoders 662 and 664, encoded at the encoders 662 and 664, and then transmitted to the party terminal through the first and second data channels 67 and 68, respectively.

The adders 621 and 624 function to add the voices of the three parties together and set the added signal at a proper level.

At the same time, the side-tone circuit 625 functions to add a proper level of side tone to the adder 621 and to adjust the signal levels at the transmitter and receiver of the handset 63.

As a result, the communication terminal apparatus of the present invention can realize three-party communications in which each party is listening to the two other party voices at suitable level (step 910).

The above explanation has been made as to the examples of the operational control of the two- and three-party communications when the terminal apparatus receives new incoming voice signal or signals during talk on the first data channel 67, but even when the present terminal apparatus receives new incoming voice signal or signals during talk on the second data channel 68, the present apparatus can cope with it based on the similar operational control.

Further, the present embodiment can process two image communications at the same time. Such simultaneous processing of two image communications of the communication terminal apparatus will be considered in the following in connection with its typical example.

For example, while the image scanner 9 is operated and an image data is being transmitted through the first data channel, if it is additionally desired to receive an image data through the second data channel, then the image main controller 5 controls the image printer 10 of the image file 7 so that the image data from the party terminal can be recorded by the image printer 10 or can be written in the image file 7.

Further, while the terminal apparatus transmits image data already written in the image file 7 through the first data channel, if it is additionally desired for the apparatus to also receive an image data from the second data channel, the image main controller 5 controls the image printer 10 or the image file 7 so that the image data from the party terminal can be recorded by the image printer 10 or can be written in the image film 7.

On the contrary, while the image printer 10 is operated and an image data is being received from the first data channel, if it is further desired to receive a new image data from the second data channel, the image main controller 5 controls the image file 7 so that the new image data from the party terminal can be written in the image file 7.

While an image data is being received from the first data channel during the write operation to the image file 7, if it is further desired for the apparatus to receive a new image data from the second data channel, then the image main controller 5 controls the image printer 10 so that the new image data from the party terminal can be recorded by the image printer 10.

While the image printer 10 is operated and an image data is being received from the first data channel, if it is additionally desired for the apparatus to transmit another image data through the second data channel, the image main controller 5 controls the image scanner 9 or the image file 7 so that the image data can be read by the image scanner 9 and directly transmitted to the party terminal or can be written in the image file 7.

Application of such control enables the communication terminal apparatus of the present invention to realize different-direction full-duplex operation for the above image communications, for example, even when the apparatus issues a new image-communication request through operator's image-processing key operation of the key input unit 2 during communication of an image data on the first data channel.

In this case, after generation of the above image-communication request, the image main controller 45, as required, starts the image scanner 9 to read the image data thereby or previously writes the image data in the image file 7 to transmit it to the party terminal through the second data channel.

Figure 10:
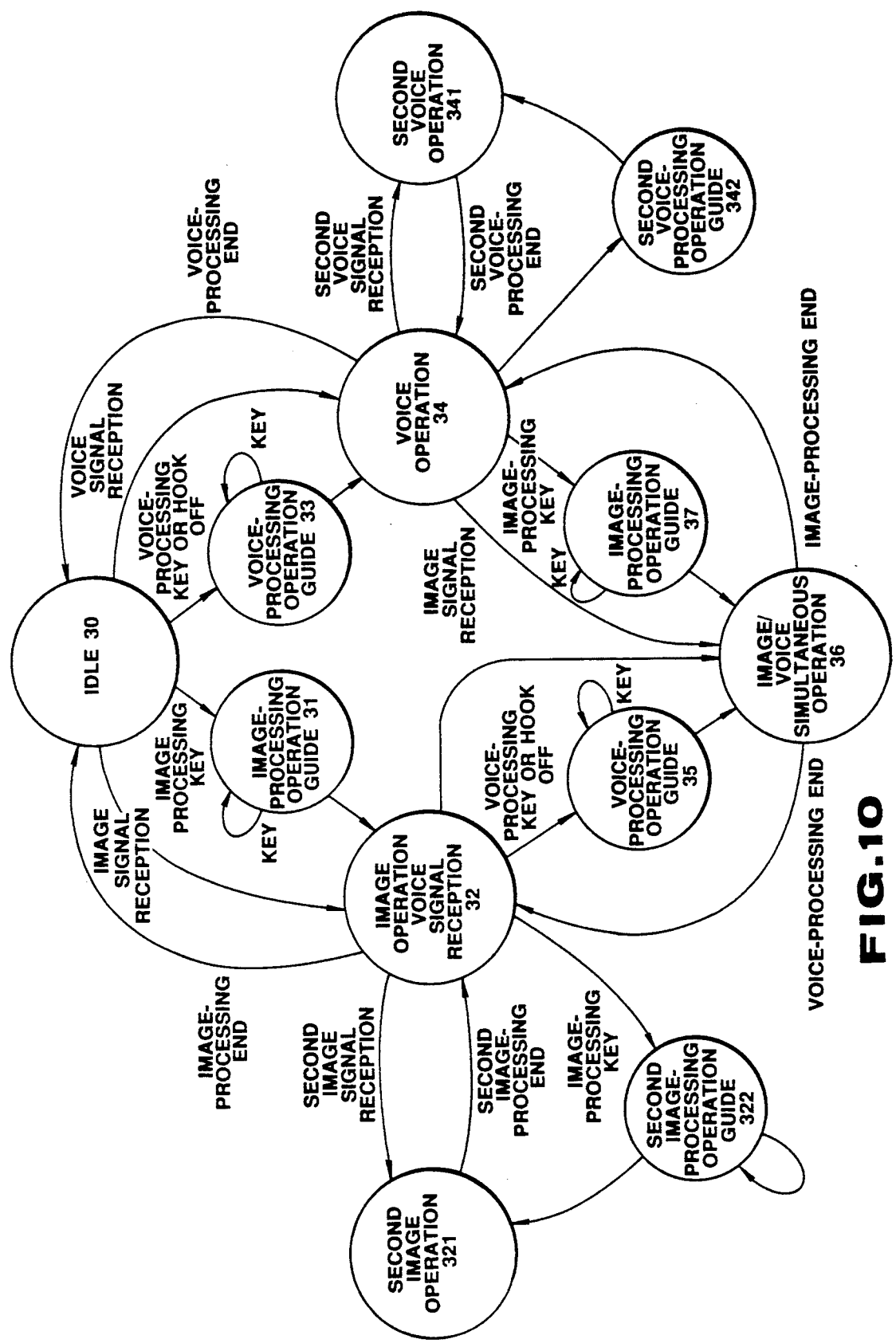
FIG. 10 is an operational-status transition diagram showing the processing flows of the communication terminal apparatus of the embodiment.

The general operational flow of the communication terminal apparatus of the present embodiment based on the foregoing arrangement and control is shown by a operational-state transition diagram of FIG. 10.

In FIG. 10, reference numeral 30 denotes an idle state. Similarly, numeral 32 denotes an image operation state, 34 a voice operation state, 36 an image/voice simultaneous operation state, 31 and 37 each an image-processing operation guide state, 33 and 35 each a voice-processing operation guide state.

In the idle state 30, the communication terminal apparatus performs no operation.

When the operator conducts the key input operation of image processing keys (such as keys indicative of the dial number of a party communication terminal apparatus) of the keyboard (key input unit 2) for example, the present terminal apparatus is shifted to the image-processing operation guide 31 for selection of the image processing services.

Thereafter, operator's section of one of the image processing services through operation of the image-processing guide causes the terminal apparatus to be shifted to the image operation state 32.

In this state 32, the completion of the image processing causes the facsimile apparatus to be returned to the idle state 30.

In the idle state 30, on the other hand, if the operator gives a voice-processing key input or an off-hook action, then the terminal apparatus is shifted to the voice-processing operation guide 33.

In the state 33, when the operator finishes his key input operation necessary for the speech based on the displayed operational guide, the terminal apparatus is shifted to the voice operation state 34.

The terminal apparatus, when receiving an incoming voice signal in the idle state 30, is also shifted directly to the voice operation state 34.

In the image operation state 37, if the terminal apparatus generates a voice operation request, then the apparatus, while continuing the image operation, is changed from the state 32 through the voice-processing operation guide state 35 to the image/voice simuntaneous operation state 36.

In the image operation state 32, if the apparatus receives an incoming voice signal, then it is shifted directly to the image/voice simultaneous operation state 36 without being once changed to the state 35.

In the voice operation state 34, operator's key input operation of the image-processing keys causes the terminal apparatus to be shifted from the voice operation state 34 through the image-processing operation guide state 37 to the image/voice simultaneous operation state 36, while continuing the voice operation.

In the voice operation state 34, if the apparatus receives an incoming image signal on the other hand, the apparatus is changed directly to the image/voice simultaneous operation state 36 without being once changed to the state 37.

In the image/voice simultaneous operation state 36, the completion of the voice processing causes the terminal apparatus to be shifted to the image operation state 32 while the completion of the image processing causest apparatus to be shifted to the voice operation state 34.

The terminal apparatus of the present embodiment, when receiving a second incoming voice signal in the voice operation mode 34, is shifted directly to a second-voice operation state 341.

In this mode 341, the apparatus maintains the first speech and carries out its answering operation to a second speech (two-party or three-party speech) under control of the voice main controller 6 in the same manner as in the foregoing.

And the completion of the answering operation to the second-voice signal reception causes the terminal apparatus to be returned to the voice operation state 34.

In the state 34, if the terminal apparatus generates a second-voice operation request through operator's predetermined key operation, the apparatus is shifted from the state 34 through a second-voice-processing operation guide state 342 to the second-voice operation state 341, continuing the so far voice operation.

The terminal apparatus of the present embodiment, when receiving a second incoming image signal in the image operation state 32, is shifted directly to a second-image operation state 321.

In this state 321, the apparatus answers its answering operation to the second image signal reception while maintaining the first image operation under control of the image main controller 5.

And the completion of the second image processing causes the terminal apparatus to be returned to the image operation state 32.

In the image operation state 32, if the terminal apparatus generates a new image operation request through operator's image-processing key operation, then the apparatus is shifted from the state 32 through a second-image processing operation guide state 322 to the second-image operation state 321, while continuing the so far image operation.

In this way, in accordance with the present embodiment, the communication terminal apparatus comprises independently operable two network controllers, a network interface for allocating operations of these network controllers to two data channels of a single ISDN line, an image transmission controller for independently executing two facsimile procedures, and an image file capable of executing write and read operations at the same time. As a result, not only the present terminal apparatus can realize the voice and image communications at the same time but it also can answer even to a new image communication request generated during its image communication, thereby realizing a good communication efficiency based on the different-direction full-duplex operation.

According to the present embodiment, the communication terminal apparatus also comprises independently operable two network controllers, a network interface for allocating operations of these network controllers to two data channels of a single ISDN line, and a voice main controller for controlling a speech circuit to allow a two-party or three-party communication when receiving a notification indicative of the reception of an incoming voice signal from second one of the two data channels of the ISDN line during talk on first one of the two channels. As a result, the present terminal apparatus can achieve the voice and image communications at the same time and also can cope with the reception of an incoming new voice signal during talk without taking its busy operation to the incoming signal, the unwanted refusal of such a speech request can be avoided and thus efficient communication can be realized.

What is claimed is:

1. A communication terminal apparatus connected to an integrated services digital network through an integrated services digital line having a plurality of data channels, comprising:

a plurality of independently operable network control means for carrying out an incoming/outgoing call procedure with respect to said integrated services digital network;

network interface means for allocating operations of said plurality of network control means to the plurality of data channels of said integrated services digital line, respectively;

voice control means connected to said plurality of network control means for carrying out an input processing operation or an output processing operation of a voice signal transmitted or received through said network control means;

image transmission control means connected to said plurality of network control means for carrying out a transmission control of image data transmitted or received through said network control means; and image control means for carrying out an input/output processing operation of the image data controllably transmitted through said image transmission control means, wherein voice speech in response to said voice control means with use of at least one of said plurality of network control means as well as image data communication in response to said image transmission control means and said image control means with use of at least another one of said plurality of network control means are carried out at the same time.

2. A communication terminal apparatus as set forth in claim 1, wherein said plurality of network control means includes first and second network control means, and when a communication request for the image data is present in the voice speech in response to the use of one of said first and second network control means and only when the other of said first and second network control means is not occupied, the image communication based on said image transmission control means and said image control means with use of said unoccupied network control means is carried out.

3. A communication terminal apparatus as set forth in claim 1, wherein said plurality of network control means includes first and second network control means, and when a voice communication request is issued during the image data communication based on said image transmission control means and said image control means with use of one of said first and second network control means and only when the other of said first and second network control means is not occupied, the voice speech output in response to said voice control means with use of said unoccupied network control means is carried out.

4. A communication terminal apparatus connected to an integrated services digital network through an integrated services digital line having a plurality of data channels, comprising:

a plurality of independently operable network control means for carrying out an incoming/outgoing call procedure with respect to said integrated services digital network;

network interface means for allocating operations of said plurality of network control means to the plurality of data channels of said integrated services digital line, respectively;

a plurality of image transmission control means connected respectively to said plurality of network control means for carrying out a transmission control of image data respectively transmitted or received through each of said plurality of network control means;

image data input means for inputting the image data controllably transmitted through a first one of said plurality of image transmission control means;

image data output means for outputting the image data controllably transmitted through a second one of said plurality of image transmission control means; and image control means for controlling said image data input means and said image data output means.

5. A communication terminal apparatus as set forth in claim 4, wherein said image data input means includes image scanner means for reading out an original document to be transmitted to obtain a read-out original output and for applying said read-out original output as the image data to said first one of said plurality of image transmission control means.

6. A communication terminal apparatus as set forth in claim 4, wherein said image data input means includes image file means for storing therein the image data to be transmitted, reading out said stored image data and applying the read out image data to said first one of said plurality of image transmission control means.

7. A communication terminal apparatus as set forth in claim 4, wherein said image data output means includes image printer means for printing the image data received through said second one of said plurality of image transmission control means.

8. A communication terminal apparatus as set forth in claim 4, wherein said image data output means includes image file means for writing therein the image data received through said second one of said plurality of image transmission control means.

9. A communication terminal apparatus as set forth in claim 4, wherein said plurality of network control means include first and second network control means, said first image transmission control means connected to said first network control means and said second image transmission control means connected to said second network means, and during a first image data communication output by said first network control means and said first image transmission control means or with use of said second network control means and said second image transmission control means and only when the other one of said first network control means and said first image transmission control means and said second network control means and said second image transmission control means are not occupied, a second image communication is output by said unoccupied network control means and image transmission control means is carried out.

10. A communication terminal apparatus connected to an integrated services digital network through an integrated services digital line having a plurality of data channels, comprising:

a plurality of independently operable network control means for carrying out an incoming/outgoing call procedure with respect to said integrated services digital network;

network interface means for allocating operations of said plurality of network control means to the plurality of data channels of said integrated services digital line, respectively;

a plurality of image transmission control means connected respectively to aid plurality of network control means for carrying out a transmission control of image data transmitted or received through said network control means;

image file means for storing the image data from a first one of aid plurality of image transmission control means and reading the image data therefrom to the first one or a second one of said image transmission control means;

image scanner means for reading out the image data to the first one of said plurality of image transmission control means from an original document to be transmitted;

image printer means for printing the image data received rom the first one of said plurality of image transmission control means; and image control means for controlling said image file means, said image scanner means and said image printer means, wherein at least two of a first communication for transmitting the image data read out from said image file means with use of one of said plurality of image transmission control means, a second communication for transmitting the image data read out through said image scanner means with use of one of said plurality of image transmission control means, and a third communication for writing the image data received through one of said plurality of image transmission control means into said image file means are carried out at the same time.

11. A communication terminal apparatus connected to an integrated services digital network through an integrated services digital line having a plurality of data channels, comprising:

a plurality of independently operable network control means for caring out an incoming/outgoing call procedure with respect to said integrated services digital network;

network interface means for allocating operations of said plurality of network control means to the plurality of data channels of said integrated services digital line, respectively;

voice control means connected to said plurality of network control means for carrying out an input/output processing operation of voice data transmitted or received through said network control means;

memory means connected to said voice control means for storing the voice data received from the voice control means and reading the voice data to the voice control means, wherein, when a voice speech request is received during voice speech output by said voice control means with use of one of said plurality of network control means, the voice speech request is accepted with use of another one of said plurality of network control means and contents of the speech associated with the voice speech request is stored in said memory means.

12. A communication terminal apparatus as set forth in claim 11, wherein said voice control means includes single voice input means for inputting the voice signal, single voice output means for outputting the voice signal, a plurality of encoding means provided as associated with said plurality of network control means for encoding the voice signal inputted from said voice input means into voice data, a plurality of decoding means provided as associated with said plurality of network control means for decoding the voice data outputted from said plurality of network control means into voice signals, and a plurality of switch means for selectively outputting the voice signal inputted from said single voice input means to said plurality of encoding means and for selectively outputting one of the voice signals outputted from said plurality of decoding means to said single voice output means.

13. A communication terminal apparatus connected to an integrated services digital network through an integrated services digital line having a plurality of data channels, comprising;
   a plurality of independently operable network control means for carrying out an incoming/outgoing call procedure with respect to said integrated services digital network;
   network interface means for allocating operations of said plurality of network control means to the plurality of data channels of said integrated services digital line, respectively; and
   voice control means connected to said plurality of network control means for carrying out an input-/output processing operation of a voice signal transmitted or received through said network control means,
   wherein said voice control means includes incoming-voice control means, when a voice speech request is received during voice speech in communication output by said voice control means with use of one of said plurality of network control means, for detecting the voice speech request and outputting an incoming signal indicative of the voice speech request as multiplexed with voice during speech, and including means for switching the voice speech in communication to a voice speech of the voice speech request.

14. A communication terminal apparatus as set forth in claim 13, wherein said voice control means further includes holding-tone control means, when the voice speech in communication is switched to the voice speech of the voice speech request, for transmitting a holding tone to a party of the voice speech in communication.

15. A communication terminal apparatus connected to an integrated services digital network through an integrated services digital line having a plurality of data channels, comprising;
   a plurality of independently operable network control means for carrying out an incoming/outgoing call procedure with respect to said integrated services digital network;
   network interface means for allocating operations of said plurality of network control means to the plurality of data channels of said integrated services digital line respectively; and
   voice control means connected to said plurality of network control means or carrying out an input-/output processing operation of a voice signal transmitted or received through said network control means,
   wherein said voice control means includes switch means for outputting the voice signal inputted from a single voice input means to said plurality of network control means and for performing an adding function using the voice signal outputted from said plurality of network control means and outputting it to a single voice output means, whereby a conference speech is realized with a plurality of parties connected through said plurality of network control means.

16. A communication terminal apparatus connected to an integrated services digital network through an integrated services digital line having a plurality of data channels, comprising:
   a plurality of independently operable network control means for carrying out an incoming/outgoing call procedure with respect to said integrated services digital network;
   network interface means for allocating operations of said plurality of network control means to the plurality of data channels of said integrated services digital line, respectively;
   display means for displaying information providing guidance to an operator as to functions for performance by the operator;
   key input means for selecting therethrough a processing according to the information displayed by said display means and entering data for carrying out said processing;
   operation control means for controlling operations of said key input means and said display means;
   voice main control means driven when the processing selected through said key input means is a voice processing associated with a voice communication; and
   image main control means driven when the processing selected through said key input means is an image processing associated with an image communication.

17. A method for controlling a communication terminal apparatus connected to an integrated services digital network through an integrated services digital line having a plurality of data channels and including:
   a plurality of independently operable network control means for carrying out an incoming/outgoing call procedure with respect to said integrated services digital network;
   voice control means connected to said plurality of network control means for carrying out an input-/output processing operation of a voice signal transmitted or received through said network control means; and
   image control means connected to said plurality of network control means for carrying out an input-/output processing operation of image data transmitted or received through said network control means,
   said method comprising:
   a first step of allocating operation of a first one of said plurality of network control means to a first one of said plurality of data channels of said integrated services digital line;
   a second step of caring out a first communication of voice or image communication under control of said voice control means or said image control means with use of said first one of said plurality of data channels;
   a third step, when a request for a second communication is received from a second one of said plurality of data channels of said integrated service digital line is present during said first communication, of allocating operation of a second network control means to said second one of said plurality of data channels of said integrated service digital line; and a fourth step of carrying out said second communication with use of said second one of said plurality of data channels.

18. A method for controlling a communication terminal apparatus connected to an integrated service digital network through an integrated services digital line having a plurality of data channels and including:

a plurality of independently operable network control means for carrying out an incoming/outgoing call procedure with respect to said integrated services digital network; and a plurality of image transmission control means connected respectively to said plurality of network control means for carrying out a transmission control of image data transmitted or received through said network control means, said method comprising:

a first step of allocating operation of a first one of said plurality of network control means to a first one of said plurality of data channels of said integrated services digital line;

a second step of carrying out a first image communication with use of said first one of said plurality of data channels and a first image transmission control means;

a third step, when an incoming signal is received on a second one of said plurality of data channels of said integrated service digital line is present during said first image communication, of allocating operation of a second one of said plurality of network control means to the second one of the plurality of data channels of said integrated service digital line; and a fourth step of receiving a second image communication associated with said incoming signal with use of said second one of said plurality of data channels and a second one of said plurality of image transmission control means.

19. A method for controlling a communication terminal apparatus connected to an integrated services digital network through an integrated services digital line having a plurality of data channels and including:

a plurality of independently operable network control means for carrying out an incoming/outgoing call procedure with respect to said integrated services digital network;

voice control means connected to said plurality of network control means for carrying out an input/output processing operation of voice data transmitted or received through said network control means; and memory means for writing the voice data therein received from said voice control means and reading the voice data therefrom to said voice control means, said method comprising:

a first step of accepting at least one voice speech request from one of said plurality of network control means during a voice speech input or output from said voice control means with use of a second one of said plurality of network control means;

a second step of storing in said memory means voice data associated with an incoming signal indicative of said at least one voice speech request;

a third step of detecting an end of the voice speech; and a fourth step, after detecting the end of the voice speech, of outputting a voice corresponding to the voice data associated with an incoming signal indicative of said at least one voice speech request stored in said memory means.

20. A method for controlling a communication terminal apparatus connected to an integrated services digital network through an integrated services digital line having a plurality of data channels and including:

a plurality of independently operable network control means or carrying out an incoming/outgoing call procedure with respect to said integrated services digital network; and voice control means connected to said plurality of network control means or carrying out an input/output processing operation of a voice signal transmitted or received through said network control means, said method comprising;

a first step of detecting, during a first voice speech output by said voice control means with use of one of said plurality of network control means, an incoming signal indicative of a request for a second voice speech received from one of said plurality of network control means;

a second step, in response to detection of said incoming signal, of performing an adding function using an incoming signal tone indicative of presence of the incoming signal with the first voice speech and for outputting a composite signal;

a third step, through a predetermined operation, of switching to any one of three of the following, the first voice speech, a voice speech associated with said request of said second voice speech, and a three-party voice speech associated with both the first voice speech and the voice speech associated with said request of said second voice speech; and a fourth step, when the first voice speech is switched to the second voice speech, of transmitting a holding tone to a party of the first voice speech.

* * * * *

UNITED STATES PATENT AND TRADEMARK OFFICE
CERTIFICATE OF CORRECTION

PATENT NO. : 5,297,146
DATED : March 22, 1994
INVENTOR(S) : Fukushige Ogawa

It is certified that error appears in the above-indentified patent and that said Letters Patent is hereby corrected as shown below:

Claim 10, column 18, line 4, change "aid" to --said--.

Claim 10, column 18, line 9, change "aid" to --said--.

Claim 11, column 18, line 39, change "caring" to --carrying--.

Claim 20, column 22, line 24, change "or" to --for--.

Signed and Sealed this

Third Day of January, 1995

Attest:

BRUCE LEHMAN

Attesting Officer

Commissioner of Patents and Trademarks